April 14, 1964
L. C. BLOOM
3,128,952
ILLUMINATING GREASE GUN
Filed July 21, 1960
2 Sheets-Sheet 1
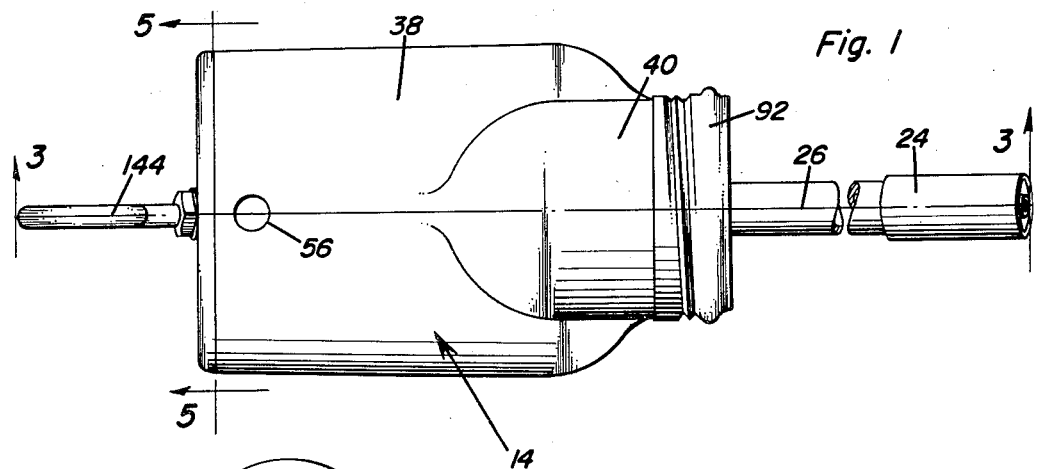
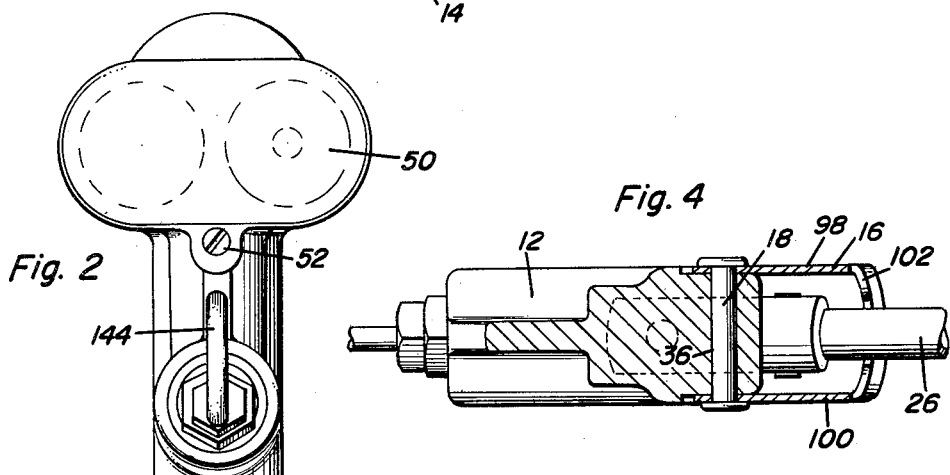
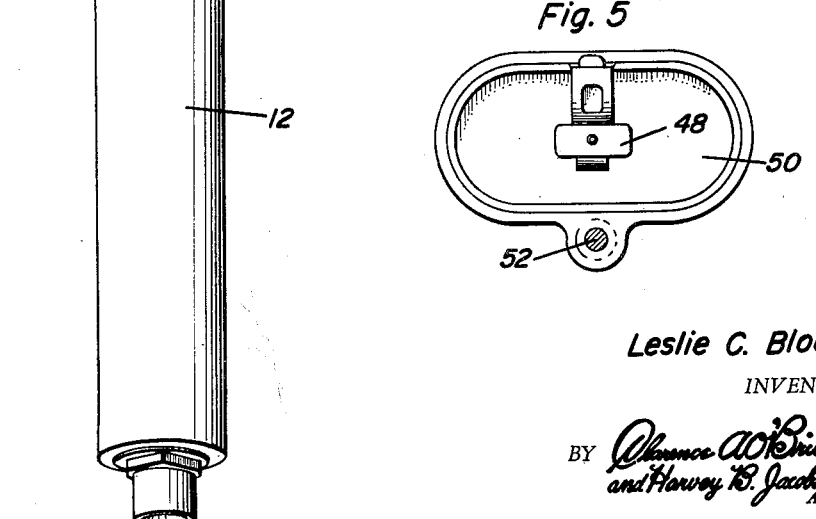
Leslie C. Bloom
INVENTOR.
BY *Clarence A. O'Brien*
*and Harvey B. Jacobson*
Attorneys

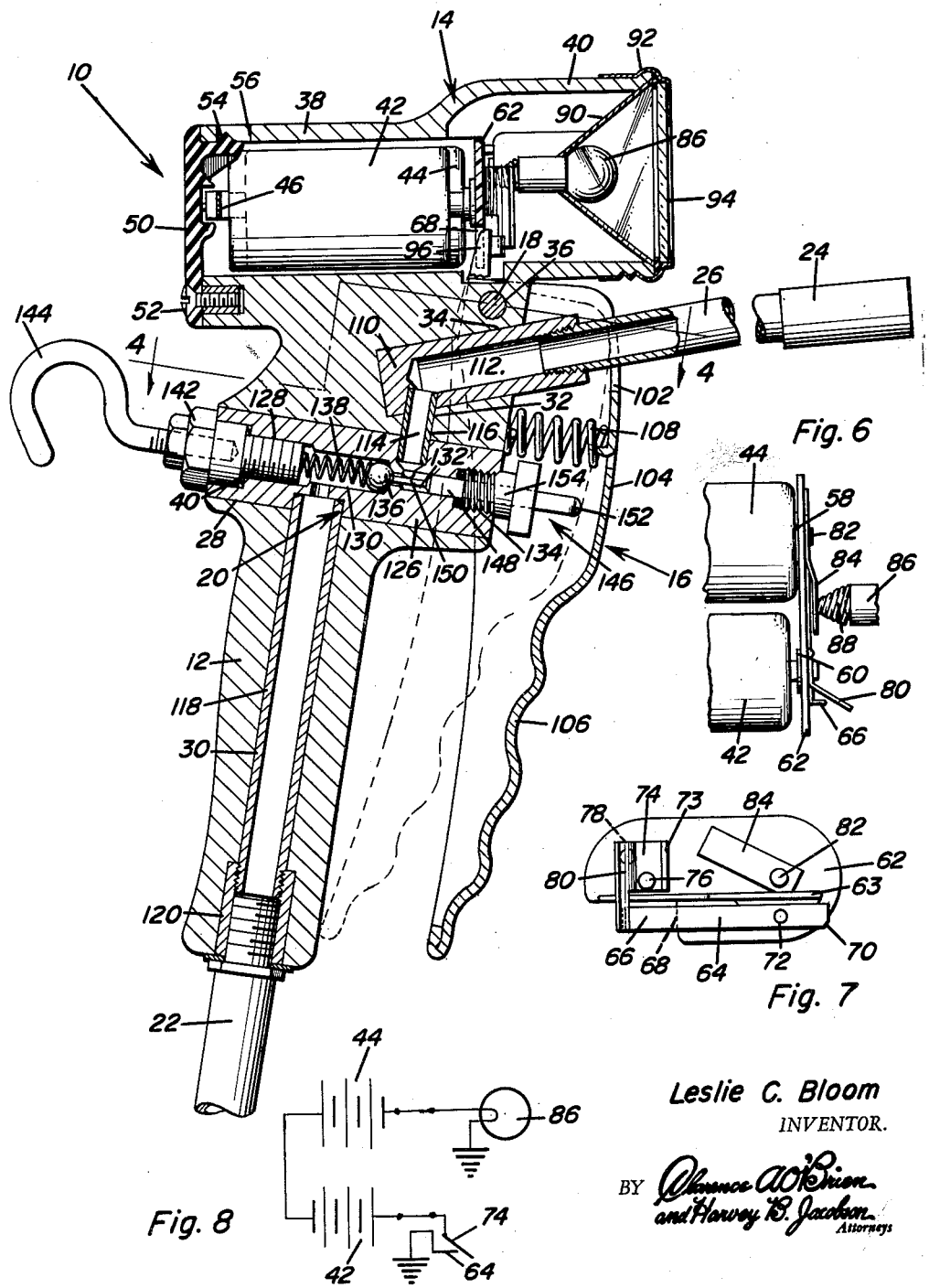

United States Patent Office 3,128,952
Patented Apr. 14, 1964

3,128,952
ILLUMINATING GREASE GUN
Leslie C. Bloom, Libby, Mont., assignor to Lubrilite Corporation, Libby, Mont., a corporation of Montana
Filed July 21, 1960, Ser. No. 44,343
9 Claims. (Cl. 240—6.46)

This invention relates to a grease gun especially adapted for use in automotive lubrication which features a novel arrangement providing illumination for the area being lubricated by the grease gun.

This application is a continuation-in-part of co-pending application Serial No. 809,787, filed April 29, 1959, now Patent No. 3,035,738, which co-pending application embodies the same basic novel combination as set forth herein relating to the accurate and sequential control of an illuminating lamp connected to the top portion of the grease gun and the valve mechanism within the grease gun for applying grease to the lubrication area desired. The importance of the device made in accordance with this invention will be apparent to anyone familiar with the problems involved in automotive chassis lubrication wherein it is often necessary to lubricate areas that are not very well lighted. The device made in accordance with this invention therefore not only directs the illumination provided toward the area being lubricated by the outlet nozzle of the grease gun but also is so arranged as to provide the illumination in response to actuation by the grease gun operator just prior to the flow of grease out of the outlet of the grease gun.

It is therefore the primary object of this invention to provide an illuminating grease gun which will in response to actuation by the operator sequentially direct a beam of light and initiate the flow of grease out of the outlet nozzle for accurately lubricating any desired area.

Another object of this invention in accordance with the foregoing object, is to provide an illuminating grease gun which is of simple and sturdy construction and is accurately adjustable for performing its sequential actuation of the illuminating lamp and the valve for supplying grease. By virtue of its construction and the efficiency with which it operates, the illuminating grease gun made in accordance with this invention is both economically feasible and highly desirable.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the illuminating grease gun made in accordance with this invention.

FIGURE 2 is a rear elevational view of the illuminating grease gun shown in FIGURE 1.

FIGURE 3 is a sectional view taken through a plane indicated by section line 3—3 in FIGURE 1.

FIGURE 4 is a sectional view taken through a plane indicated by section line 4—4 in FIGURE 3.

FIGURE 5 is a sectional view taken through a plane indicated by section line 5—5 in FIGURE 1.

FIGURE 6 is a partial top plan view of the switch plate operatively disposed between the batteries and light bulb.

FIGURE 7 is a front elevational view of the switch plate assembly.

FIGURE 8 is a schematic circuit diagram of the control circuit for the lamp.

Referring to the drawings in detail, the illuminating grease gun is generally indicated by the reference numeral 10 as more completely illustrated in FIGURE 3. The grease gun 10 includes a grip handle assembly including a fluid handling portion 12 and a lamp casing portion 14 integrally connected to the upper end of the handle portion. A valve actuating lever portion 16 is provided and is pivoted to an upper end of the handle portion 12 by means of pivot pin 18. A valve mechanism generally indicated by reference numeral 20 is disposed within the handle portion 12 and extends transversely therethrough. An inlet conduit 22 is connected to the lower end of the handle 12 while an outlet nozzle 24 is positioned as shown in FIGURE 3 to direct a flow of grease for intersection with a light beam from lamp 14 at a lubrication point, the nozzle therefore being disposed at the end of an outlet conduit 26 connected to the grease gun.

The handle portion 12 of the grease gun as more clearly seen in FIGURE 3, includes a transverse bore 28 into which the valve mechanism 20 is inserted. The transverse bore 28 is also in communication with a vertically disposed longitudinal bore 30 and a bore 32 disposed on the other side of the bore 28 opposite the inlet bore 30 with latter bore 32 is in communication with an outlet bore 34. Also, an aperture 36 is provided at the upper end of the handle 12 just below the casing portion 14 for the lamp for receiving the pivot pin 18 therein. With regard to the lamp casing portion 14 integral with the handle 12, it will be observed that there is a rear compartment 38 to said casing 14 which is of wider horizontal extent than a forward compartment 40 of casing 14 which is of greater vertical extent than the rear portion 38 as will be more clearly seen in FIGURES 1 and 2. The rear portion 38 of the casing 14, it will be apparent, contains a source of energy such as batteries for the lamp while the front portion 40 mounts a source of light such as the lamp bulb 86.

It will be observed that a pair of batteries 42 and 44 are disposed within the rear portion 38 of the casing 14 as will be seen in FIGURES 3 and 6, said batteries being inserted into the casing portion 38 from the rear end thereof and connected in series by means of a battery contact strip 46 which contacts the central terminal post of battery 44 and the casing of battery 42. The contact strip 46 is mounted on a back-up pad 48 connected to the inside of the battery cover plate 50 as seen in FIGURE 5. The battery cover plate is accordingly made of non-conductive material and is secured to the rear end of the casing portion 38 by means of a screw fastener 52 and hooked to the top portion of the casing portion 38 by means of a projection 54 engaging within an aperture 56.

The forward end of the batteries 42 and 44 engage terminals 58 and 60 mounted on the rear side of a switch plate 62 as more clearly seen in FIGURES 6 and 7. The switch plate 62 constituting a partition between the rear and forward compartments 38 and 40 as seen in FIGURE 7 mounts light controlling mechanism and is of such shape as to generally conform to the inner walls of the front portion 40 of the casing 14 within which the switch plate 62 is disposed. Also mounted on the forward side of the switch plate 62 is a movable switch element 64 of the control mechanism having a flexibly movable end 66 disposed in front of a recess 68 formed in the switch plate 62 while the other end 70 of the switch element 64 is chamfered so as to be in wedging contact with the inner side wall of the casing 14 in order to thereby ground the switch element 64. The switch element 64 is mounted on the switch plate by means of a rivet 72. Also mounted on the switch plate 62 is a stationary switch element 74 mounted thereon by means of a rivet 76 and prevented from rotation by means of a rivet projection 78 as seen in FIGURE 7.

The stationary switch element 74 has a forwardly projecting portion 80 with which the flexibly movable portion 66 of the switch element 64 comes in contact when actuated. The rivet mounting 76 for the stationary switch element 74 is connected to the terminal 60 on the other side of the switch plate while the other terminal 58 is connected to a rivet 82 which mounts a flexible element 84 which contacts one terminal of the bulb 86 through a tapered coil spring 88. From the foregoing it will be apparent that the switch plate 62 is necessarily made of a non-conductive material and also includes ribs 63 and 73 as seen in FIG. 7 for limiting movement of elements 84 and 74 respectively. The bulb 86 is mounted within a metallic reflector 90 to thereby ground another terminal of the bulb to the casing portion 40. The reflector 90 is maintained in its assembled position on the casing portion 40 by means of a threaded retainer 92 which also mounts in front of the reflector 90 a transparent member such as glass 94.

From the foregoing description and with reference to FIGURE 8, the operation of the lamp will become apparent. Accordingly, when the movable switch element 64 is brought into contact with the stationary switch element 74 a circuit is closed between ground including the batteries 42 and 44 connected in series with the lamp 86 to thereby energize the lamp and provide the desired illumination.

In order to actuate the movable switch element 64, an upwardly projecting control projection 96 is provided on the upper end of the lever member 16 which upwardly projecting portion 96 is pivotally movable in a clockwise direction about the pivot pin 18 and hence moved through the recess 68 of the switch plate 62 so as to close the contacts of the switch elements 64 and 74 so as to energize the lamp for providing the illumination. It will also be observed that the lever member 16 is of U-shaped configuration in cross-section as seen in FIGURE 4 having side walls 98 and 100 through which the pivot pin 18 extends for the purpose of pivotally mounting the lever member 16 on the handle 12. An opening 102 is provided in the front wall 104 of the lever member 16 in order to accommodate the outlet conduit or tube 26. It will also be observed in FIGURE 3, that the lower portion of the lever member 16 includes a finger gripping configuration 106 for facilitating actuation of the lever member in a clockwise direction toward the handle 12 by the hand of the operator. The lever member 16 is accordingly biased counterclockwise by means of a spring 108 disposed between the upper portion of the lever member 16 and a front wall of the upper end of the handle 12.

It will be observed that the outlet tube 26 to which the grease nozzle 24 is connected is threadedly engaged within a tubular insert 110 which is disposed within the bore 34 of the handle, said tubular insert 110 including an outlet passage 112 which is in communication with a passage 114 formed within a tubular member 116 inserted into the bore 32 of the handle 12. The inlet conduit 22 is also connected to the valve bore 28 and the valve mechanism 20 by means of a tubular insert 118 disposed within the bore 30, said tubular insert 118 being threadably engaged with a tubular fitting 120 inserted within the lower end of the handle 12 to which the inlet conduit 22 is secured by means of a standard connection. Accordingly, it will be observed that the valve mechanism 20 controls the admission of grease from the inlet conduit 22 through the inlet 118 and subsequently out of the connecting passage 114 to the outlet passage 112 and the outlet tube 26 and finally through the outlet nozzle 24.

The valve mechanism is inserted into the transverse bore 28 in the handle 12 and includes a valve casing 126 within which stepped bores 128, 130, 132 and 134 are provided. The outlet connecting passage 114 is in communication with the bore 132 while the inlet tube 118 is in communication with the bore 130. Accordingly, a one way ball-type valve element 136 is provided between the bores 130 and 132 so as to close the passage therebetween. The ball valve element 136 is biased to closing position by means of a spring 138 abutting against the valve element 136 and an abutment screw member 140. The abutment screw member is axially positioned in its adjusted position by means of a nut head 142 on the screw member 140 thereby designed to condition the bias of spring 138 against the ball valve element as required. Also threadedly connected to the abutment screw member 140 is a suspension hook 144 whereby the grease gun may be suspended when not in use.

In order to actuate the ball valve element 136 against the bias of spring 138 so as to open the passage between the bores 130 and 132 for admitting grease from the inlet 22 into the outlet nozzle 24, a valve actuator mechanism generally indicated by reference numeral 146 is provided and includes a plunger element 148 having an inner necked down end 150 contacting the ball valve element 136 and an outer end 152 engageable with the inside of the front wall 104 of the lever member 16. The plunger element 148 is axially positioned within the valve bore 132 by means of a packing nut member 154 which is threadedly engaged within the threaded bore 134 of the valve casing 126. Accordingly, by accurately adjusting the position of the valve actuator plunger element 148, actuation of the lever member 16 by the operator will first close the switch elements 64 and 74 so as to energize the bulb and provide the illumination just prior to actuation of the actuating mechanism 146 to open the valve mechanism 20 for admitting grease.

From the foregoing description, operation of the illuminating grease gun will be apparent. Also, the efficient disposition of the various parts enabling a more accurately adjustable and more efficiently operating illuminating grease gun to be realized will be readily recognized by those skilled in the art. Accordingly as a result of the novel arrangement of parts, the grease gun operator may direct a beam of light on the area to be lubricated prior to the application of grease to the desired area so as to enable location of the lubricating point by the operator without unnecessary and wasteful use of grease.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An illuminating grease gun comprising longitudinal handle means having inlet means and outlet means for directing a flow of grease in a direction transverse to the handle means, illuminating means connected to one longitudinal end of said handle means spaced from the outlet means for directing a beam in intersecting relation to the direction of fluid flow forwardly of the outlet means, valve means disposed within said handle means intermediate said one end and an opposite longitudinal end of said handle means for controlling flow of grease between said inlet and outlet means, valve actuating means operatively connected to said valve means and extending laterally of said handle means; control means disposed within said illuminating means and operative to establish illumination in response to actuation thereof, lever means pivotally connected to said handle means at said one end extending in longitudinal spaced relationship thereto and being operative in response to movement thereof laterally toward said handle means to sequentially actuate said control means and valve actuating means, said inlet means including a longitudinal passage extending from said opposite end of said handle means to said valve means and said outlet means includes a passage extending from said valve means laterally out of said handle means and through said lever means.

2. The grease gun as defined in claim 1, wherein said illuminating means is enclosed within a casing integral with said handle means and said valve means extends transversely through said handle means between adjacent ends of said inlet and outlet means.

3. The grease gun as defined in claim 2, wherein said illuminating means includes battery means disposed within a rear portion of said casing, bulb means disposed within a forward portion of the casing and separated from said rear portion by a switch plate mounting said control means, the projecting portion of said handle means being movable through a recess in said switch plate to actuate the control means and energize said bulb means from said battery means.

4. The grease gun as defined in claim 3, wherein said control means includes a movable switch element mounted on the switch plate and engageable by the projecting portion of the handle means and grounded by the casing, and a stationary switch element mounted on said switch plate in contact with said battery means, said switch plate also mounting terminal means operatively in contact with said battery means and one terminal of said bulb means, the other terminal of the bulb means being grounded by the casing.

5. The grease gun as defined in claim 4, wherein said valve means comprises a transverse valve bore in communication with the inner ends of said inlet and outlet means, a one-way valve disposed in said bore and biased closed by an adjustable spring mechanism extending rearwardly out of said handle means, said valve being opened by said valve actuating means operatively connected thereto and extending forwardly out of the valve bore.

6. An illuminating grease gun comprising longitudinal handle means having inlet means and outlet means for directing a flow of grease in a direction transverse to the handle means, illuminating means connected to one longitudinal end of said handle means spaced from the outlet means for directing a beam in intersecting relation to the direction of fluid flow forwardly of the outlet means, valve means disposed within said handle means intermediate said one end and an opposite longitudinal end of said handle means for controlling flow of grease between said inlet and outlet means, valve actuating means operatively connected to said valve means and extending laterally of said handle means, control means disposed within said illuminating means and operative to establish illumination in response to actuation thereof, lever means pivotally connected to said handle means at said one end extending in longitudinal spaced relationship thereto and being operative in response to movement thereof laterally toward said handle means to sequentially actuate said control means and valve actuating means, said inlet means including a longitudinal passage extending from said opposite end of said handle means to said valve means and said outlet means including a passage extending from said valve means laterally out of said handle means and through said lever means, said valve actuating means being enclosed by said lever means and said lever means including a projecting portion extending into said illuminating means for actuation of said control means, said illuminating means being enclosed within a casing integral with said handle means and said valve means extending transversely through said handle means between adjacent ends of said inlet and outlet means, said illuminating means including battery means disposed within a rear portion of said casing, bulb means disposed within a forward portion of the casing and separated from said rear portion by a switch plate mounting said control means, the projecting portion of said handle means being movable through a recess in said switch plate to actuate the control means and energize said bulb means from said battery means, said control means including a movable switch element mounted on the switch plate and engageable by projecting portion of the handle means and grounded by the casing, and a stationary switch element mounted on said switch plate in contact with said battery means, said switch plate also mounting terminal means operatively in contact with said battery means and one terminal of said bulb means, the other terminal of the bulb means, being grounded by the casing, said battery means including a pair of batteries connected in series and insertable from the rear end of said casing, said valve means comprising a transverse valve bore in communication with the inner ends of said inlet and outlet means, a one-way valve disposed in said bore and biased closed by an adjustable spring mechanism extending rearwardly out of said handle means, said valve being opened by said valve actuating means operatively connected thereto and extending forwardly out of the valve bore, said valve actuating means including a plunger adjustably positioned within said valve bore and actuated by said lever means.

7. An illuminating grease gun comprising longitudinal handle means having an inlet means and outlet means for directing a flow of grease, illuminating means connected to an upper end of said handle means spaced above the outlet means for directing illumination for intersection with said flow of grease forwardly of the outlet means, valve means disposed within said handle means intermediate said upper end and a lower end of said handle means for controlling a flow of grease between said inlet and outlet means, valve actuating means operatively connected to said valve means and extending forwardly out of said handle means, control means disposed within said illuminating means and operative to provide illumination therefrom in response to actuation thereof, lever means pivotally connected to said handle means spaced below the illuminating means extending forwardly and downwardly therefrom and being operative in response to movement thereof toward said handle means to sequentially actuate said control means and valve actuating means, said illuminating means being enclosed within a casing integral with said handle means and said valve means extending transversely through said handle means between adjacent ends of said inlet and outlet means, said illuminating means including battery means disposed within a rear portion of said casing, bulb means disposed within a forward portion of the casing and a switch plate mounting said control means and separating said rear portion from the forward portion of the casing, the lever means having a projecting portion movable through a recess in said switch plate to actuate the control means and energize said bulb means from said battery means, said control means including a movable switch element mounted on the switch plate and engageable by the projecting portion of the lever means and grounded by the casing, and a stationary switch element mounted on said switch plate in contact with said battery means, said switch plate also mounting terminal means operatively in contact with said battery means and one terminal of said bulb means, the other terminal of the bulb means being grounded by the casing.

8. The grease gun as defined in claim 7, wherein said valve means comprises a transverse valve bore formed in the handle means in communication with adjacent ends of said inlet and outlet means, a one-way valve disposed in said bore and biased closed by an adjustable spring mechanism extending rearwardly out of said handle means, opposite the valve actuating means, said valve being opened by said valve actuating means operatively connected thereto also extending forwardly out of the valve bore into contact with the lever means.

9. An illuminating grease gun comprising longitudinal handle means having an inlet means and outlet means for directing a flow of grease, illuminating means connected to an upper end of said handle means spaced above the outlet means for directing illumination for intersection with said flow of grease forwardly of the outlet means, valve means disposed within said handle means intermediate said upper end and a lower end of said handle means for controlling a flow of grease between said inlet and outlet means, valve actuating means operatively connected to said valve means and extending forwardly out of said handle means, control means disposed within said illuminating means and operative to provide illumination therefrom in response to actuation thereof, lever means pivotally connected to said handle means spaced below the illuminating means extending forwardly and downwardly therefrom and being operative in response to movement thereof toward said handle means to sequentially actuate said control means and valve actuating means, said illuminating means being enclosed within a casing integral with said handle means and said valve means extending transversely through said handle means between adjacent ends of said inlet and outlet means, said illuminating means including battery means disposed within a rear portion of said casing, bulb means disposed within a forward portion of the casing and a switch plate mounting said control means and separating said rear portion from the forward portion of the casing, the lever means having a projecting portion movable through a recess in said switch plate to actuate the control means and energize said bulb means from said battery means, said control means including a movable switch element mounted on the switch plate and engageable by the projecting portion of the lever means and grounded by the casing means, and a stationary switch element mounted on said switch plate in contact with said battery means, said switch plate also mounting terminal means operatively in contact with said battery means and one terminal of said bulb means, the other terminal of the bulb means being grounded by the casing, and suspension hook means connected to said handle means adjacent to said adjustable spring mechanism.

References Cited in the file of this patent

UNITED STATES PATENTS

| | | |
|---|---|---|
| 1,160,518 | Lynne | Nov. 16, 1915 |
| 1,225,865 | Schneible | May 15, 1917 |
| 1,285,553 | Bateman | Nov. 19, 1918 |
| 1,644,081 | Preble | Oct. 4, 1927 |
| 1,848,179 | Kiester | Mar. 8, 1932 |
| 2,240,195 | Reiber | Apr. 29, 1941 |
| 2,330,592 | Kendrick | Sept. 28, 1943 |
| 2,593,942 | Van Vliet | Apr. 22, 1952 |